United States Patent
Hansen et al.

(10) Patent No.: US 11,608,815 B2
(45) Date of Patent: Mar. 21, 2023

(54) WIND TURBINE BLADE LIGHTNING PROTECTION SYSTEM

(71) Applicant: LM WIND POWER A/S, Kolding (DK)

(72) Inventors: Lars Bo Hansen, Kolding (DK); Mathilde Aubrion, Kolding (DK); Christian Elkjaer-Holm, Kolding (DK); Madhusudhan Nanjedevanapura Veerappa, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/292,983

(22) PCT Filed: Nov. 19, 2019

(86) PCT No.: PCT/EP2019/081825
§ 371 (c)(1),
(2) Date: May 11, 2021

(87) PCT Pub. No.: WO2020/104471
PCT Pub. Date: May 28, 2020

(65) Prior Publication Data
US 2022/0003214 A1 Jan. 6, 2022

(30) Foreign Application Priority Data

Nov. 20, 2018 (EP) ...................................... 18207424

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2230/60* (2013.01); *F05B 2240/304* (2020.08)

(58) Field of Classification Search
CPC ................................ F03D 80/30; B64D 45/02
See application file for complete search history.

(56) References Cited

U.S. PATENT DOCUMENTS 8,177,509 B2 *  5/2012  Hansen  ................... F03D 80/30
                                                    416/146 R
9,660,433 B2 *  5/2017  Chung  ................... H02G 13/20
(Continued)

FOREIGN PATENT DOCUMENTS

EP          2930353 A1 * 10/2015  ........... F03D 1/0675
JP     2016-136009 A       7/2016
(Continued)

OTHER PUBLICATIONS

English translation of WO2015124365A1 (Year: 2015).*
(Continued)

*Primary Examiner* — Eric J Zamora Alvarez
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

Disclosed is a wind turbine blade comprising a shell body, a down conductor arranged in the shell body for conducting lightning current to ground, an electrical connector arranged in electrical connection with the down conductor, a lightning receptor element arranged at a surface of the shell body or outside the shell body, the lightning receptor element being in electrical connection with the electrical connector. A method for manufacturing a wind turbine blade with a lightning protection system is also provided.

14 Claims, 10 Drawing Sheets

(56) References Cited

U.S. PATENT DOCUMENTS

| | | | | |
|---|---|---|---|---|
| 10,344,743 | B2* | 7/2019 | Bendlak | F03D 80/30 |
| 10,443,579 | B2* | 10/2019 | Tobin | F03D 80/30 |
| 10,519,928 | B2* | 12/2019 | Yarbrough | F03D 1/0675 |
| 10,823,139 | B2* | 11/2020 | Hallissy | F03D 1/0675 |
| 10,927,809 | B2* | 2/2021 | Barton | F03D 1/0675 |
| 11,015,582 | B2* | 5/2021 | Barton | F03D 1/0675 |
| 11,060,508 | B2* | 7/2021 | Dahl | F03D 80/30 |
| 11,118,571 | B2* | 9/2021 | Dahl | F03D 80/30 |
| 2009/0139739 | A1* | 6/2009 | Hansen | F03D 80/30 |
| | | | | 174/2 |
| 2009/0196751 | A1 | 8/2009 | Jacobsen et al. | |
| 2011/0305574 | A1* | 12/2011 | Stiesdal | F03D 1/065 |
| | | | | 416/146 R |
| 2013/0272892 | A1* | 10/2013 | Liu | F03D 80/30 |
| | | | | 416/225 |
| 2018/0135602 | A1* | 5/2018 | Tobin | F03D 1/0675 |

FOREIGN PATENT DOCUMENTS

| | | | | |
|---|---|---|---|---|
| WO | WO-2015124365 A1 * | 8/2015 | | F03D 80/30 |
| WO | 2018/137806 A1 | 8/2018 | | |

OTHER PUBLICATIONS

English translation of EP2930353A1 (Year: 2015).*
Search Report dated May 17, 2019 issued in corresponding European Application No. 18207424.
Search Report dated Feb. 14, 2020 issued in corresponding International Application No. PCT/EP2019/081825.

* cited by examiner

WIND TURBINE BLADE LIGHTNING PROTECTION SYSTEM

This is a National Phase Application filed under 35 U.S.C. 371 as a national stage of PCT/EP2019/081825, filed Nov. 19, 2019, an application claiming the benefit of European Application No. 18207424.5, filed Nov. 20, 2018, the content of each of which is hereby incorporated by reference in its entirety.

The present disclosure relates to lightning protection of a wind turbine blade.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that, inside the blade, are in electric connection with a metallic down conductor that is able to connect a lightning current to earth.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties is to combine various types of fibres in the laminate of the blades. It is e.g. an option to combine glass fibres and carbon fibres, and likewise carbon fibres or glass fibres may advantageously be combined with steel fibres. Combinations with other types of fibres are thus also possible, and it is also an option to exclusively employ carbon fibres or other suitable fibre types. A combination of e.g. glass fibres with carbon fibres in a so-called hybrid laminate may possess a problem in that some of the fibre types are electrically conductive, e.g. carbon fibres and steel fibres. A lightning strike directly into the laminate may cause damage to a blade comprising electrically conductive fibres, as they would conduct the current and thereby i.a. be greatly heated. This is particularly problematic in case of fibres having comparatively poor conductivity, such as carbon fibres, and in case of hybrid laminates with fibres in e.g. mat-shape, where the individual mat may e.g. have a small portion of electrically conductive fibres and a larger portion of e.g. glass fibres that are not electrically conductive.

There is a need for a robust way of installing lightning receptors at a trailing edge of a wind turbine blade in the vicinity of a tip end of wind turbine blades. In this region, wind turbine blades usually have relatively small dimensions. Arranging a lightning receptor in this region and connecting it to a down conductor poses certain problems, including that the down conductor is often a relatively thick cable compared to the dimensions of the space at the trailing edge of the blade in the vicinity of the tip end.

Furthermore, there is a need for alternative lightning receptors.

SUMMARY OF THE INVENTION

In a first aspect, a wind turbine blade is provided having a lightning protection system. The wind turbine blade comprises a shell body, a down conductor arranged in the shell body for conducting lightning current to ground, an electrical connector arranged in electrical connection with the down conductor, a lightning receptor element arranged at a surface of the shell body or outside the shell body, the lightning receptor element being in electrical connection with the electrical connector.

The lightning receptor element advantageously comprises graphite for conducting lightning current to the down conductor. However, it is recognised that the following embodiments relating to the design of the lightning protection system are also applicable to other types of lightning receptors, such as metallic receptors.

The inventors have found that a lightning receptor comprising graphite may be surprisingly advantageous compared to a receptor formed of metal. For instance, no lightning crater is made in a graphite receptor. This means that it is surprisingly durable and therefore will not change noise characteristics even if struck by lightning. Because no crater is made, there will be no melted metal being thrown off, contaminating the surroundings. When a lightning channel attaches to the graphite receptor, the lightning channel may spread out to completely surround the surface of the receptor. This reduces heat transmission and air pressure raise, putting less stress on the immediate surroundings. It was also found that a crater in stainless-steel receptors could create high frequency noise. In Tungsten receptors, this is less the case as the crater is more rounded.

Accordingly, at least 30% of an external surface of the lightning receptor element consists of graphite, such as at least 50%, such as at least 75%, such as at least 90%. The entire external surface may consist of graphite.

The lightning receptor may instead or in addition have an exterior portion not at the surface of the shell body but extending outside the shell body. A surface of the exterior portion may advantageously comprise graphite. For instance, at least 30% of the surface of the exterior portion of the lightning receptor element consists of graphite, such as at least 50%, such as at least 75%, such as at least 90%. The entire external surface may consist of graphite.

In combination or alternatively, at least 20% by volume of the exterior portion of the lightning receptor element consists of graphite. In some embodiments, a higher portion by volume of the exterior portion of the lightning receptor element consists of graphite, such as at least 50%, such as at least 75%, such as at least 90%. For instance, the entire exterior portion of the lightning receptor element may consist of graphite.

In some embodiments, the lightning receptor element is located at a trailing edge of the shell body, opposite a leading edge of the shell body.

In some embodiments, the lightning receptor element is releasably attached to the electrical connector, allowing the lightning receptor element to be replaced if needed. The electrical connector may for instance comprise an internal threading and the lightning receptor element may comprise a corresponding external threading or, vice versa, the electrical connector may comprise an external threading and the lightning receptor element may comprise a corresponding internal threading. In case the lightning receptor element is made entirely of graphite, a threading, such as an external threading, can act as means for attaching the lightning receptor element to the electrical connector, the electrical connector having a threading that mates with the threading in the lightning receptor element.

A second aspect provides a wind turbine blade with a lightning protection system. The wind turbine blade comprises a shell body, a down conductor arranged in the shell body for conducting lightning current to ground, an electrical connector arranged in electrical connection with the down conductor, a lightning receptor element having an exterior portion extending outside the shell body, the lightning receptor element being in electrical connection with the electrical connector. The shell body has an opening for accommodating a lightning receptor element. The blade further has a cover member that comprises:
- a first cover portion having a covering surface engaging with a first exterior surface part of the shell body, the first cover portion covering a first portion of the opening,
- a second cover portion having a covering surface engaging with a second exterior surface part of the shell body, the second cover portion covering a second portion of the opening,
- the first and second cover portion being attached to a cover member base portion comprising a central opening for accommodating the electrical connector and/or the lightning receptor element, when inserted into the electrical connector.

The inventive cover member provides a robust way of installing a lightning receptor, especially at the trailing edge in the vicinity of the tip end of a wind turbine blade, where the blade is typically more fragile due to the tip end's relatively small dimensions. This applies to receptors made entirely of graphite, receptors comprising graphite, metallic receptors and other types of receptors.

Some embodiments of the first aspect provide a wind turbine blade wherein the shell body comprises an opening accommodating the electrical connector and/or the lightning receptor element, and the blade further comprises a cover member attached to the shell body, the cover member covering the shell body opening, the cover member comprising:
- a first cover portion having a covering surface configured to engage with a first exterior surface part of the shell body, the first cover portion covering a first portion of the opening,
- a second cover portion having a covering surface configured to engage with a second exterior surface part of the shell body, the second cover portion covering a second portion of the opening,
- the first and second cover portion being attached to a cover member base portion comprising a central opening accommodating the electrical connector and/or the lightning receptor element connected to the electrical connector.

That is, the wind turbine blade comprises the electrical connector and/or the lightning receptor element.

In some embodiments, the lightning receptor element is located at or near a trailing edge of the blade, opposite a leading edge of the blade. The exterior portion of the lightning receptor element may be for instance comprise a metal.

In some embodiments, the exterior portion of the lightning receptor element is made of graphite in addition to or instead of metal. For instance, at least 30% of the surface of the exterior portion of the lightning receptor element consists of graphite, such as at least 50%, such as at least 75%, such as at least 90%. The entire external surface may consist of graphite.

In combination or alternatively, at least 20% by volume of the exterior portion of the lightning receptor element consists of graphite. In some embodiments, a higher portion by volume of the exterior portion of the lightning receptor element consists of graphite, such as at least 50%, such as at least 75%, such as at least 90%. For instance, the entire exterior portion of the lightning receptor element may consist of graphite.

In some embodiments, a curvature of the covering surface of the first cover portion corresponds to a curvature of the first exterior surface part of the shell body. This provides a snugger fit between the first cover portion and the first exterior surface part. Similarly, a curvature of the covering surface of the second cover portion corresponds to a curvature of the second exterior surface part of the shell body. This provides a snugger fit between the second cover portion and the second exterior surface part.

The covering surface of the first cover portion may comprise one or more walls which, when the first cover portion engages the first exterior surface part, define a first chamber together with the first exterior surface part. Similarly, the covering surface of the second cover portion may comprise one or more walls which, when the second cover portion covers the second portion of the opening, define a second chamber. The first portion of the cover member may comprise one or more holes arranged to allow at least a part of the first chamber, such as substantially all of the first chamber, to be filled with gluing material for rigidly attaching the first portion of the cover member to the first exterior surface part. Similarly, the second portion of the cover member may comprise one or more holes arranged to allow at least a part of the second chamber, such as substantially all of the second chamber, to be filled with gluing material for rigidly attaching the second portion of the cover member to the second exterior surface part.

The cover member makes it possible to effectively cover openings located for instance near the trailing edge of a wind turbine blade.

The cover member can be made of for instance plastic, metal, a glass-based material, a carbon-based material, a resin-based material, or a combination thereof.

In some embodiments, the first cover portion, the second cover portion, and the base portion can be considered to have a beak-like shape.

The cover member base portion may comprise one or more, such as two, trailing edge members configured to reduce an aerodynamic impact of the cover element when the blade is in motion.

In some embodiments, the first cover portion and/or the second cover portion comprises a laminate provided across the first portion of the opening and/or across the second portion of the opening in the shell body.

A third aspect provides a method for manufacturing a wind turbine blade with a lightning protection system, the method comprising:
- providing a wind turbine shell body having a leading edge, a trailing edge, and a tip end, the shell body having an opening for accommodating an electrical connector for connecting a lightning receptor element to a down conductor,
- attaching an electrical connector to the down conductor for connecting a lightning receptor element,
- installing a cover member, the cover member comprising:

a first cover portion having a covering surface configured to engage with a first exterior surface part of the shell body, the first cover portion covering a first portion of the opening in the shell body for accommodating the electrical connector, a second cover portion having a covering surface configured to engage with a second exterior surface part of the shell body, the second cover portion covering a second portion of the opening in the shell body for accommodating the electrical connector, the first and second portion being attached to a cover member base portion comprising a central opening for accommodating the electrical connector and/or the lightning receptor element, when inserted into the electrical connector, attaching a lightning receptor element to the electrical connector through the cover member base portion central opening.

According to an advantageous embodiment, the blade shell body comprises two blade shell parts, and the method further comprises: attaching a down conductor to one or both shell parts. In yet another advantageous embodiment, the method comprises joining the two shell parts to form the shell body.

In some embodiments, the opening in the shell body is formed in the trailing edge of the shell body.

While it is clear from the above that the recess is formed in blade shells, it is also recognized that the blade tip or blade could be manufactured first after which a recess is cut at the trailing edge to expose the end of the down conductor and to arrange the electrical connector. Forming the opening after manufacturing the shell body in fact has the advantage that blade shrinkage has ceased, which might otherwise cause recesses made during manufacturing of the shell body to be misaligned as a result of uneven shrinkage between blade shells.

In the above, the shell body opening is described as being covered by a cover member. However, in an alternative embodiment, it is also recognised that an accommodating member arranged in the shell body opening can provide a smooth transition to the shell body. The accommodating member can for instance accommodate part of the lightning receptor element and/or part of the electrical connector and/or part of the down conductor. The accommodating member can be made of for instance plastic, metal, a glass-based material, a carbon-based material, a resin-based material, or a combination thereof. The accommodating member is advantageously made of an electrically insulating material. In one embodiment, the accommodating member is arranged so that a surface of the accommodating member is flush with the shell body.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF SELECTED EMBODIMENTS

Figure 1:
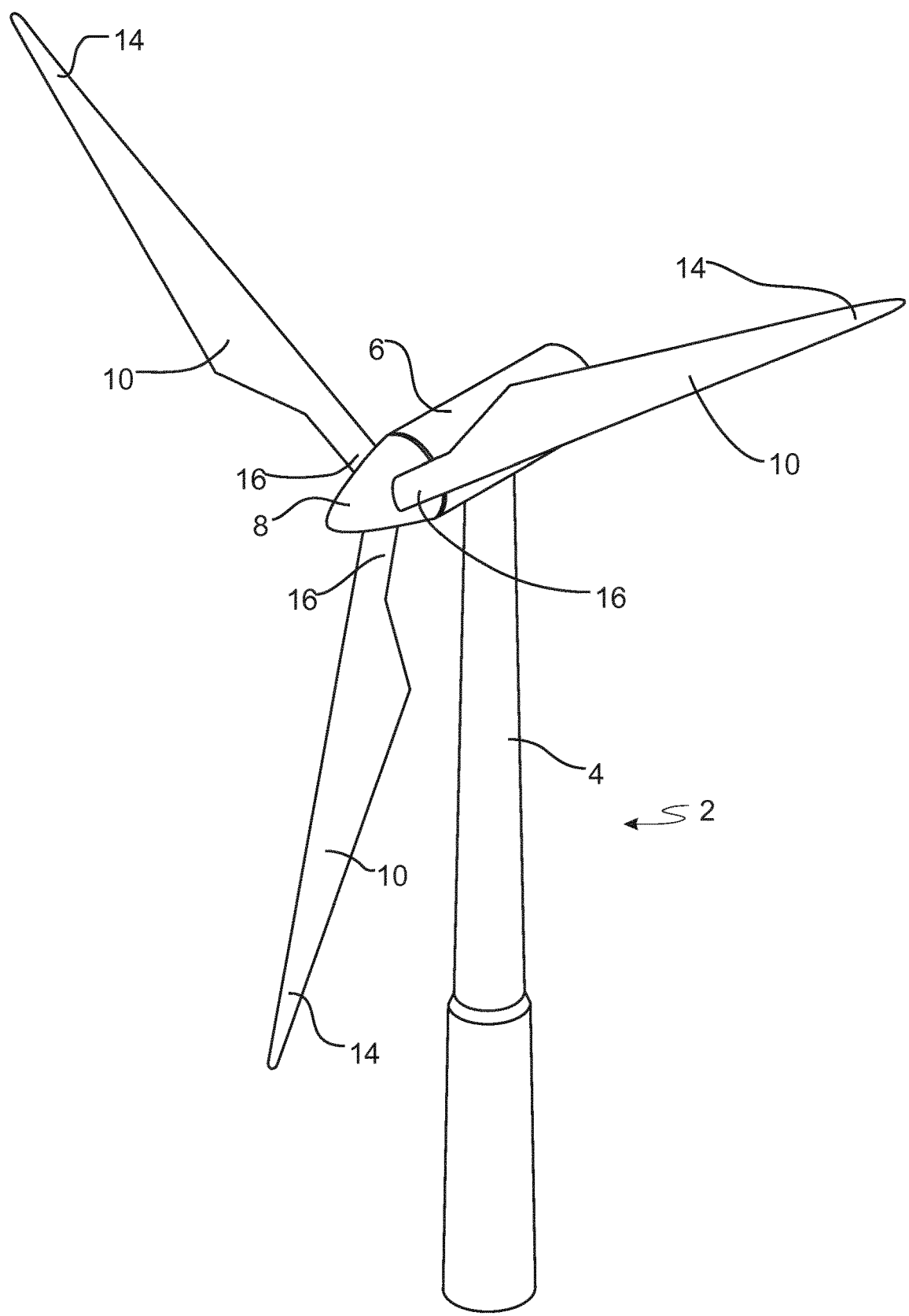
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
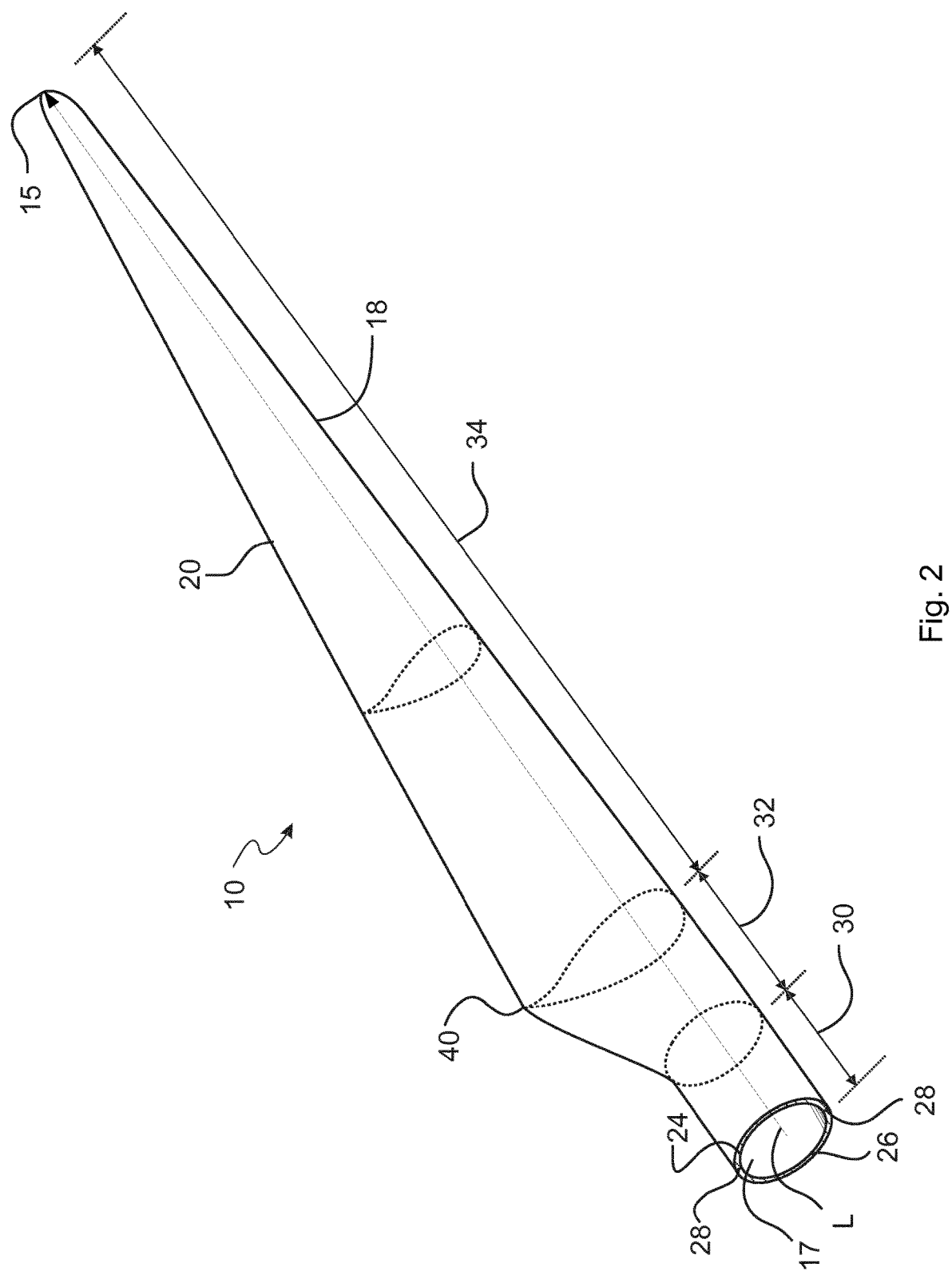
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30, due to structural considerations, has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell, which may comprise two blade shell parts, viz. a first blade shell part 24 and a second blade shell part 26, for instance made of fibre-reinforced polymer. The first blade shell part 24 may be a pressure side shell part. The second blade shell part 26 may be a suction side shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L.

Figure 3:
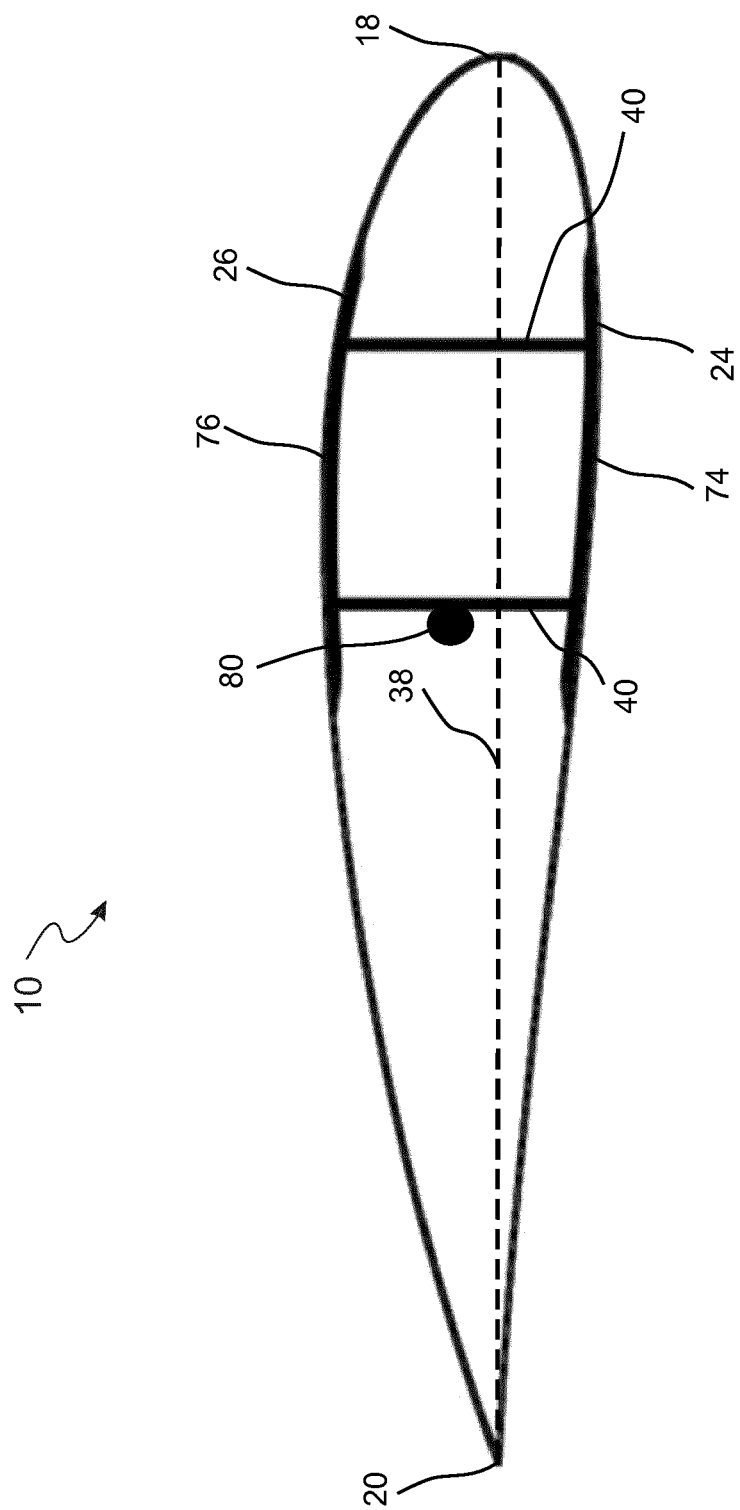
FIG. 3 is a schematic diagram illustrating a cross section of an exemplary wind turbine blade.

FIG. 3 is a schematic diagram illustrating a cross-sectional view of an exemplary wind turbine blade 10, e.g. a cross-sectional view of the airfoil region of the wind turbine blade 10. The wind turbine blade 10 comprises a leading edge 18, a trailing edge 20, a pressure side 24 and a suction side 26.

The wind turbine blade 10 defines a chord line 38 between the leading edge 18 and the trailing edge 20.

The wind turbine blade 10 comprises one or more shear webs 40 connected between a first spar cap 74 and a second spar cap 76 for providing structural strength, such as a leading edge shear web 40b and a trailing edge shear web 40a. The load carrying structure could alternatively be provided in form of a spar box with spar sides, such as a trailing edge spar side and a leading edge spar side.

A lightning conductor 80 extends from the root end 17 towards the tip end 15. The down conductor 80 may be attached to the trailing edge shear web 40a. Alternatively, the first down conductor 80 may be attached to the leading edge shear web 40b.

Figure 4A:
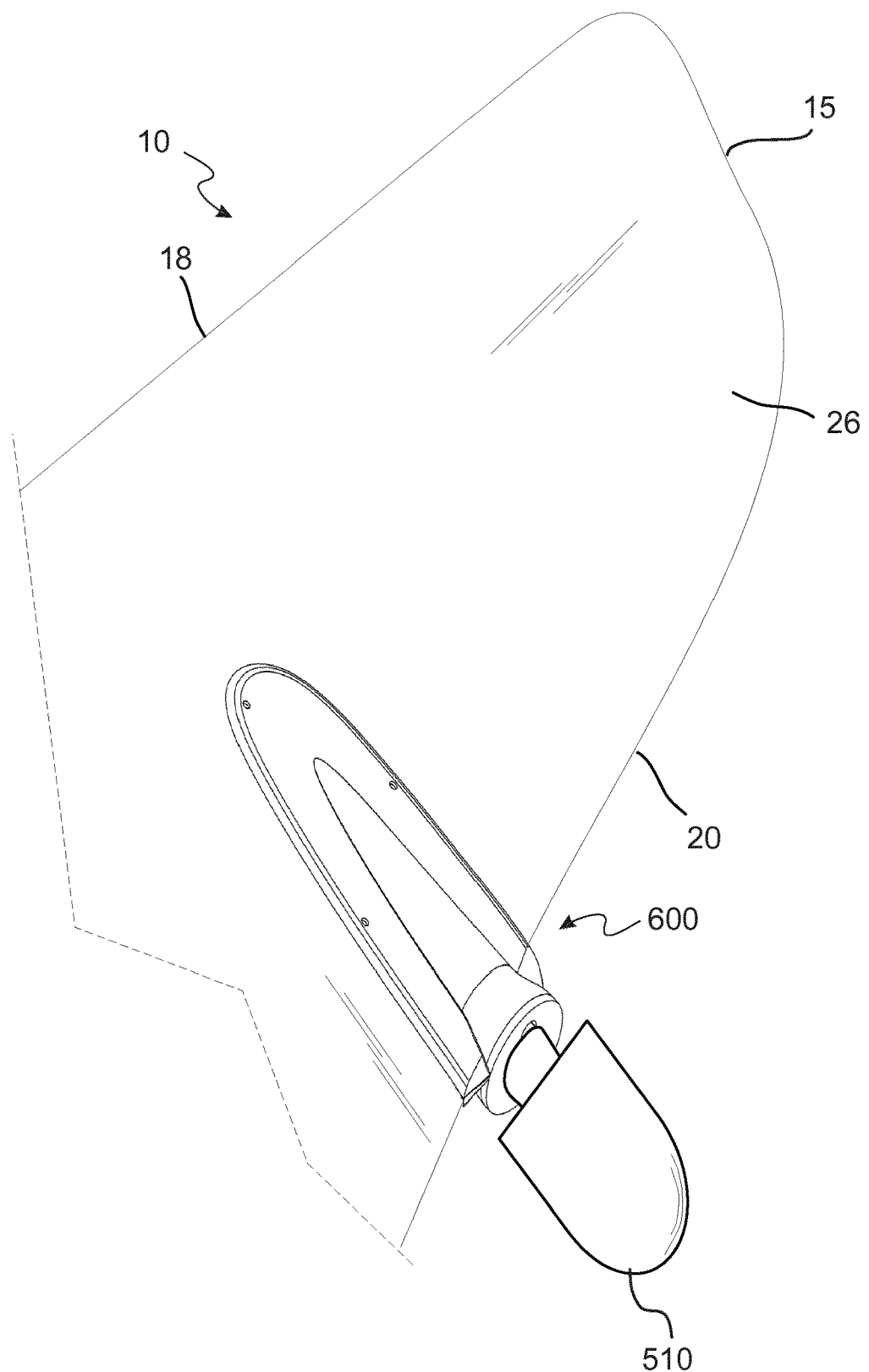
FIG. 4A is a schematic diagram illustrating an interior tip of an exemplary wind turbine blade with a lightning receptor.

FIG. 4A illustrates a suction side of a tip end of a wind turbine blade 10, where the tip end has a lightning receptor installed. The lightning receptor is arranged at the trailing edge 20 of the blade. A lightning receptor element having an exterior portion 510 located outside an interior of the blade is connected to a down conductor inside the blade in order to conduct lightning current from a lightning strike to ground. The lightning receptor element is connected to the down conductor via an electrical connector. The electrical connector is covered by a cover member 600 and is therefore not visible in FIGS. 4A and 4B.

Figure 4B:
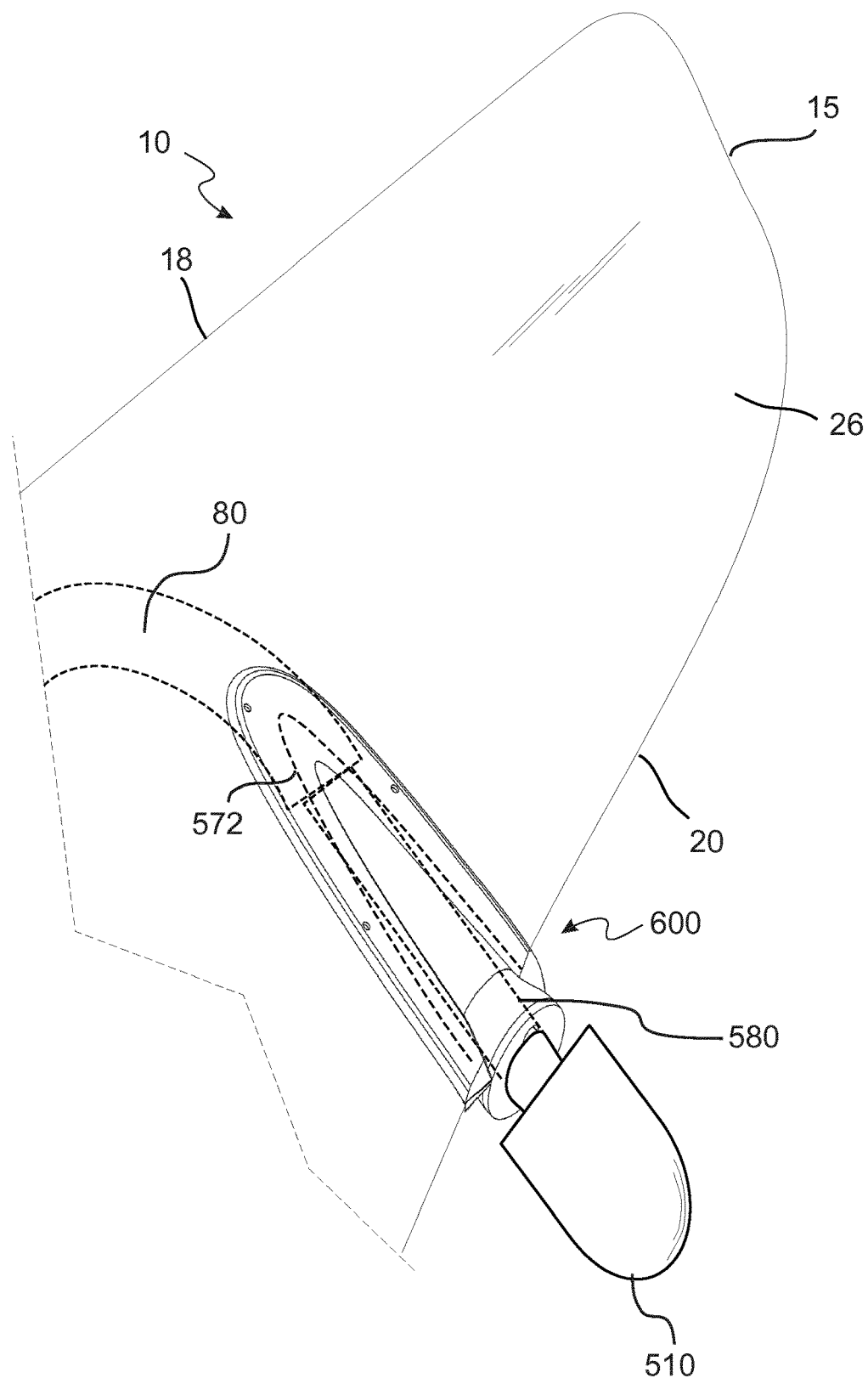
FIG. 4B is a schematic diagram illustrating an interior tip of an exemplary wind turbine blade with a lightning receptor.

FIG. 4B illustrates how the lightning receptor element is connected to the down conductor. FIG. 4B illustrates a part of the down conductor 80, which, in this case, has the shape of a cable. Generally, the down conductor is dimensioned to be able to conduct enough current so that a lightning strike will not damage (or at least not significantly damage) the down conductor. In some cases, a problem associated with using a sufficiently large cable is that terminating the cable at the trailing edge 20 to allow connection of the lightning receptor element 510 after forming the shell body would require that a relatively large opening be provided to accommodate the cable. This severely compromises the strength and integrity of the tip end of the blade.

Figure 5A:
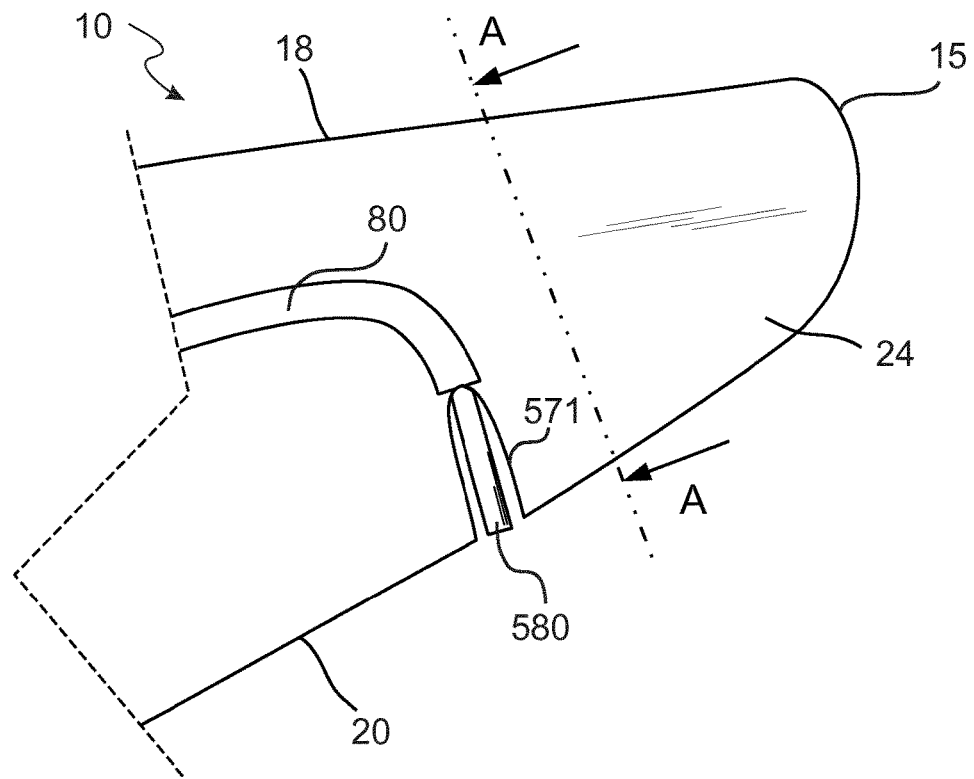
FIG. 5A-5D illustrate shell parts of an exemplary wind turbine blade adapted for a lightning receptor.
Figure 5B:
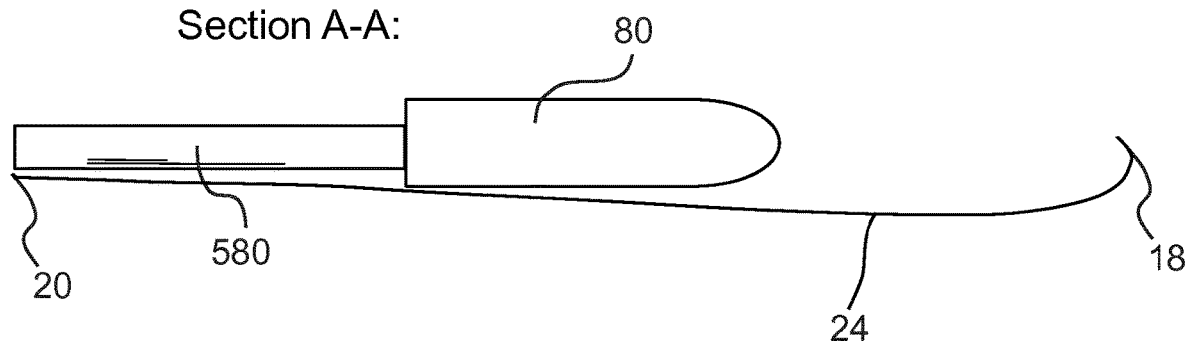

This is mitigated in some embodiments of the invention, including the embodiment shown in FIGS. 4A and 4B, by using an adapter 580 between the down conductor and the lightning receptor element. The adapter has a thickness smaller than the thickness of the down conductor cable, as illustrated in FIGS. 5A and 5B, described below. In FIG. 4B, the adapter 580 is shown with hatched lines since it is covered by the blade and by a cover member 600.

To connect the adapter, the down conductor cable may for instance be fitted with attaching means, such as a cable shoe, that can receive the adapter 580. The cable shoe may for instance provide a connector having and external threading, and the adapter may have a corresponding internal threading (or vice versa with respect to the threading). A connector 581 having an external threading is illustrated in FIG. 5D, which will be described later.

At the end opposite the end to be attached to the down conductor cable, the adapter has attachment means for attachment of the lightning receptor, which has corresponding attachment means. For instance, the adapter may have an internal threading, and the lightning receptor element may have a corresponding external threading.

Even if using an adapter, an opening is still required in the blade to accommodate the adapter, which terminates in the vicinity of the trailing edge 20. However, the opening need not be as large as would be required had the down conductor cable itself been terminated at the trailing edge 20.

Whether an adapter is used or not, there will be an opening in the blade during manufacturing near the electrical connector to which the lightning receptor element is connected. Such an opening allows for instance dust and water to enter the interior of the blade and should therefore be closed off.

FIG. 5A shows a first blade shell part 24 with a cable down conductor 80 and an adapter 580 laid out. A recess 571 is provided in the shell to accommodate the adapter. The recess may be formed during layup. However, it is also possible to cut the recess into the blade tip after manufacturing of the blade shell.

FIG. 5B illustrates the section A-A indicated in FIG. 5A. It shows the first blade shell part 24, the cable 80, and the adapter 580 near the tip end 15. It can be seen that the cable 80 is relative large compared to the blade near the tip end. If the cable was terminated at the trailing edge 20, a significantly larger opening would be needed. Instead, the adapter 580 has a smaller thickness than the cable 80 and makes it possible to reduce the size of the opening needed to accommodate the adapter 580. (Note that the recess 571 is not visible in the cross-sectional view A-A.)

Figure 5C:
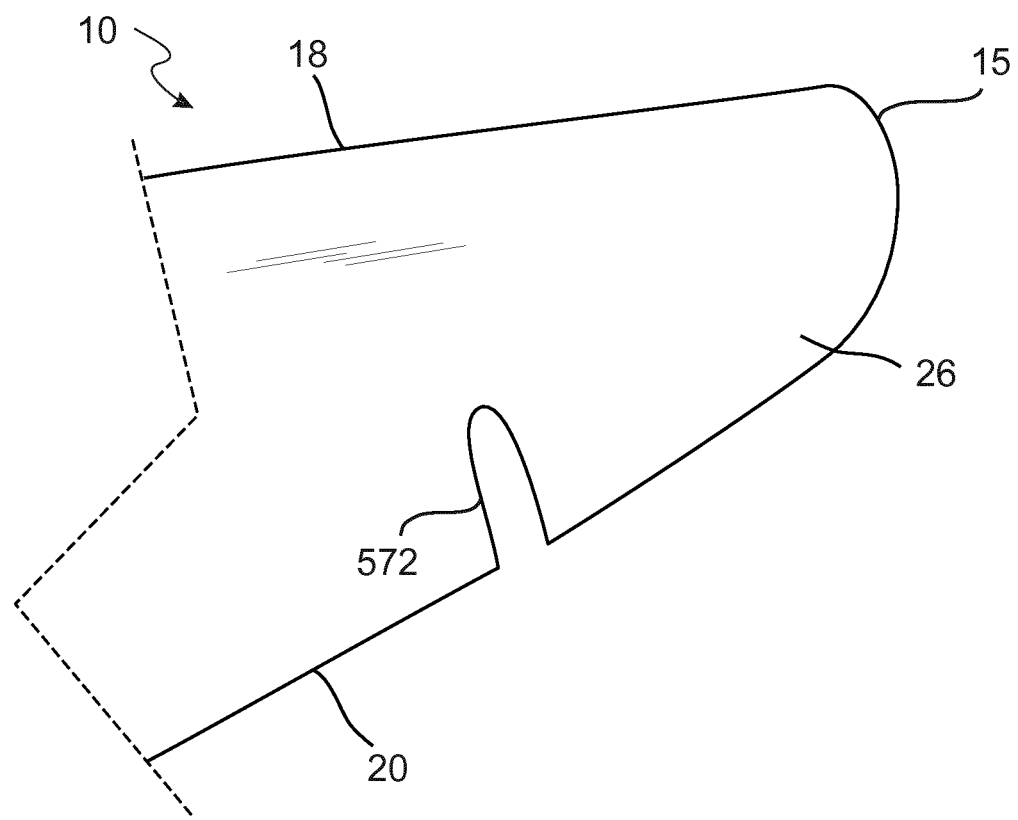
Figure 5D:
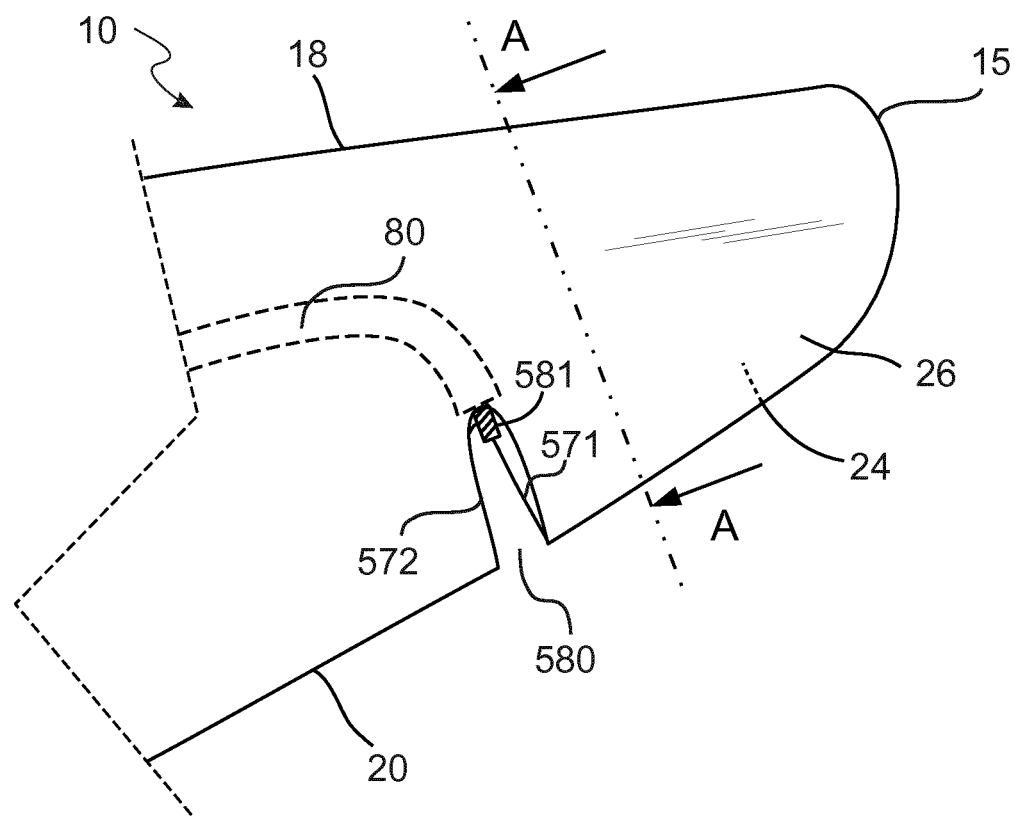

FIG. 5C illustrates a second blade shell part 26. A recess 572 is provided also in this shell part. This is to provide as aerodynamic a profile as possible.

FIG. 5D illustrates the shell part 26 and shell part 24 glued together. The interior of the blade now contains the cable 80 with the connector 581. The connector 581 is located to allow the adapter shown in FIG. 5A to be connected to the down conductor cable. Attaching the adapter after joining the shells to form the shell body avoids complications that might arise from having the adapter near the edges of the two shells 24 and 26 when joining the shells.

FIG. 5D also shows the openings 571 and 572 formed in the shells 24 and 26, respectively, to accommodate the adapter 580.

After assembling the blade, the adapter 580 can be attached. An adapter attached to the connector 581 is illustrated in FIG. 5A. An opening still remains around the adapter 580, and this opening must be closed off.

Referring back to FIGS. 4A and 4B, this is, in some embodiments, achieved by attaching a separate cover member 600 over the remaining opening. The cover member 600 has cover portions for covering each of the shell openings 571 and 572. After attaching the cover member 600, the lightning receptor element 510 can be attached to the adapter (electrical connector) 580.

Figure 6:
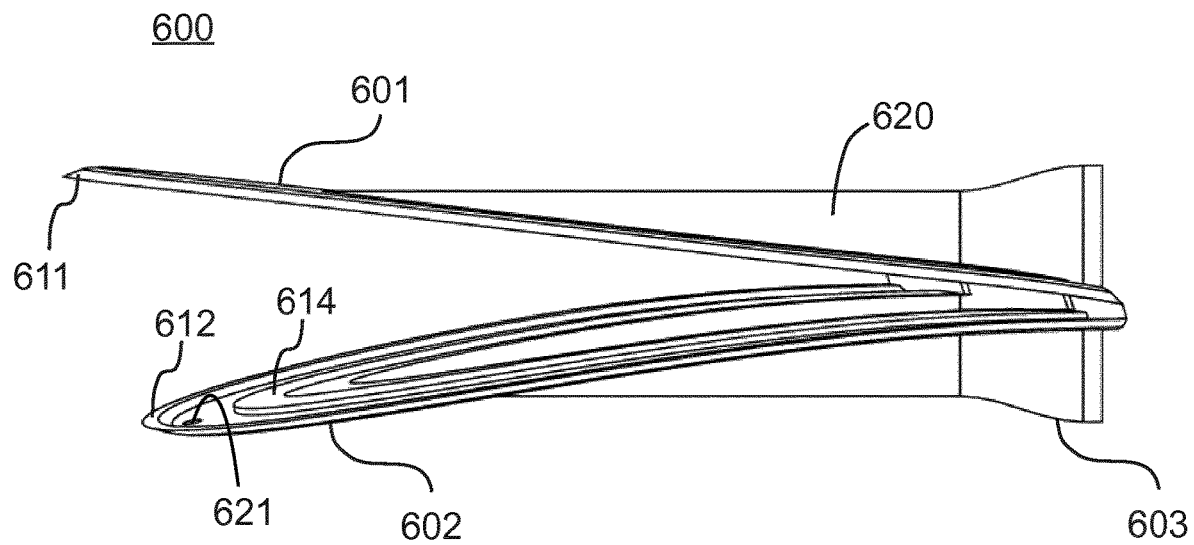
FIGS. 6-9 is a schematic diagram of an exemplary cover member.

FIG. 6 illustrates an embodiment of a cover member. A first portion 601 fits over the recess 571 in the first blade shell part 26, and a second portion 602 fits over the recess 572 in the second blade shell part 24. Portions 601 and 602 are larger than the openings 571 and 572 to allow for attachment of the cover member onto the exterior surface of the shell body. The portions 601 and 602 are preferably shaped to follow the curvature of the respective areas of the blade that they engage with. FIG. 4B shows the cover member attached to the blade 10. The recess 572 in the shell 26 is covered by the cover member 600 but is indicated with a dashed line to illustrate how the cover member is dimensioned to cover both the recess 572 and also allow for attachment of the cover member onto the shell 26, for instance by gluing.

Referring again to FIG. 6, the two cover portions 601 and 602 are connected to a base portion 603. In this embodiment, the cover member 600 has a cylindrically-shaped portion 620 to accommodate a cylindrical adapter 580.

FIG. 6 illustrates that this embodiment of a cover member has side walls 612 and 614 that may cooperate with the surface of the shell body to create a chamber when the cover member is attached to the shell body. Holes 621, 722, and 828 (see FIG. 8 and FIG. 9) allow a glue to be injected into the chamber after the cover member is placed on the blade over the recess 571. Providing two side walls as shown allows glue to be confined to a space delimited by the second cover portion 602, including side walls 612 and 614, and the surface of the shell 26 with which the second portion 602 of the cover member 600 engages. This prevents glue from entering the opening in the shell body, where it is simply wasted, providing no gluing effect.

Figure 7:
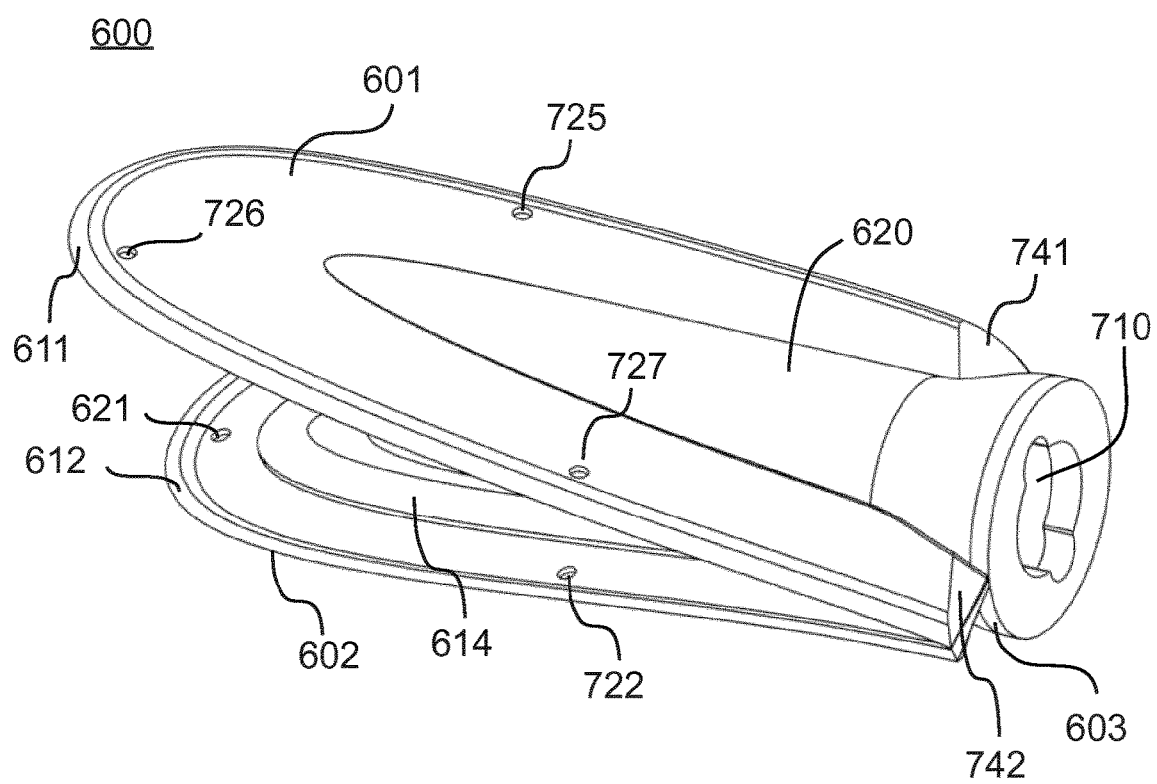
Figure 9:
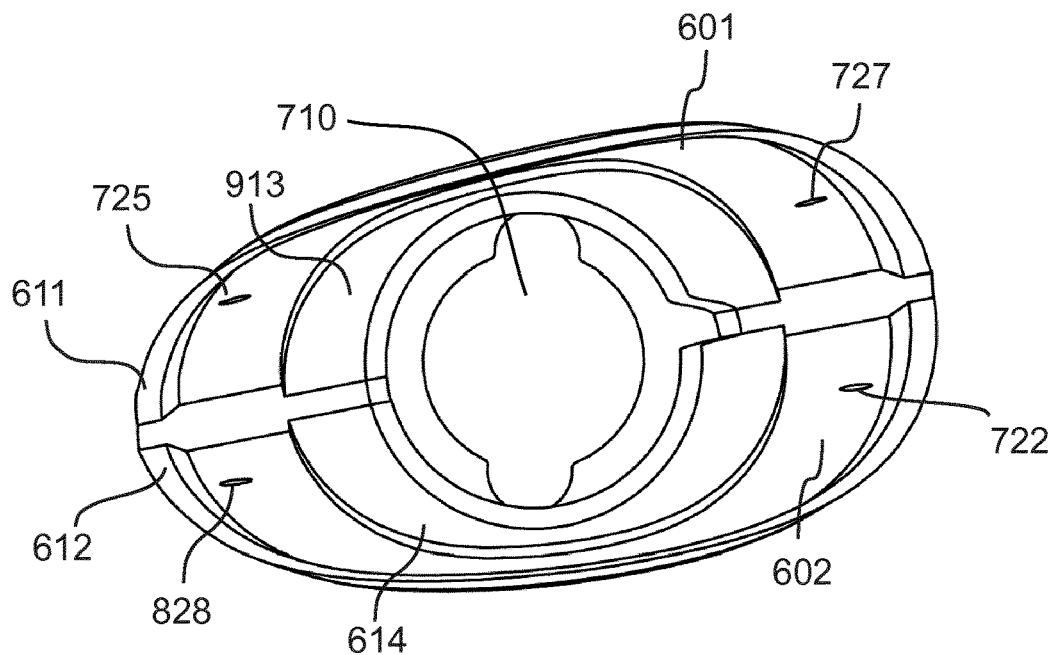

FIG. 7 illustrates holes 725, 726, 727 for injecting glue into a similar chamber formed by the blade and the first portion 601. Only one side wall 611 is illustrated in FIG. 7. FIG. 9 illustrates both side walls 611 and 913 of the first cover portion 601.

FIG. 7 also shows a central opening 710 in the base portion 603 for allowing the lightning receptor element to be connected to the down conductor (for instance using an adapter 580 as described above). The opening 710 may optionally be formed to not just accommodate the electrical connector, but also to allow injection of e.g. an epoxy or another adhesive into the shell body interior. This will firmly secure the adapter 580, whereby relative movement between the adapter 580 and the shell body is avoided. Otherwise, the adapter might shift when the blade is in motion, which could cause damage to the shell body and/or to the cover member.

FIG. 7 also illustrates two trailing edge portions 741 and 742 of the cover member. These may be provided as noise-reducing means to reduce noise associated with the cover member 600. For instance, they can be tapered towards the trailing edge. The cover member and trailing edge portions 741 and 742 are arranged at an angle relative to the cylindrical portion 620 in order to allow the cover member to more closely follow the trailing edge of the blade, as illustrated in FIGS. 4A and 4B.

Figure 8:
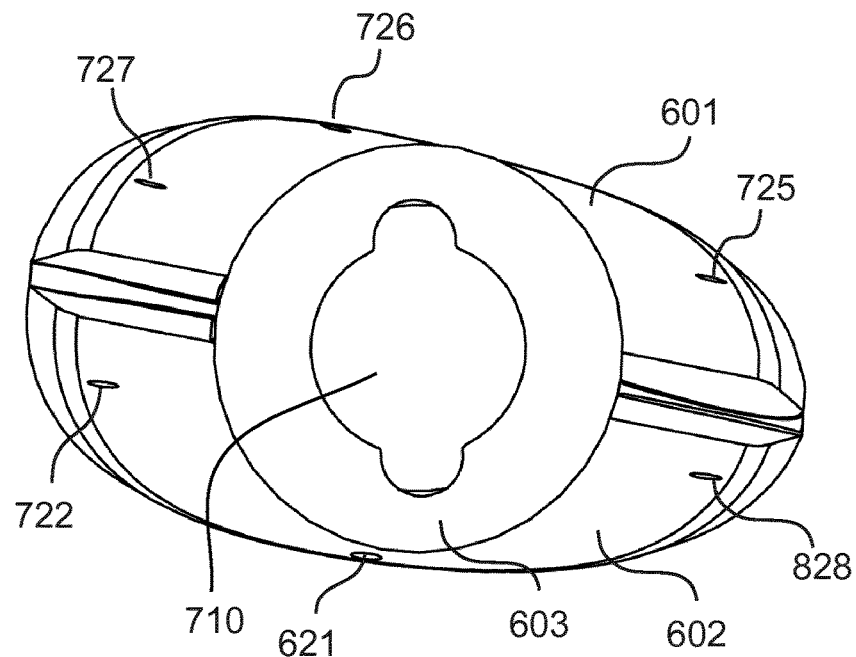

FIG. 8 illustrates the cover member as seen from the base portion 603, looking through the opening 710 along the cylindrical portion 620. It is seen that the cover member is configured to follow a narrowing blade, as the space between the first portion 601 and the second portion 602 narrows from left to right in FIG. 8. This can also be seen in FIG. 9. The opening 710 is configured to accommodate both the adapter 580 and to allow an adhesive, such as epoxy, to be injected into the blade after the adapter is attached to the connector 581.

FIG. 9 illustrates the cover member seen from a direction opposite that in FIG. 8. This view shows the holes 722 and 828 for injecting glue into the chamber formed by side walls 612 and 614 and the surface of the shell with which the second cover portion 602 engages. FIG. 9 also shows a second side wall 913 in the first cover portion that cooperates with side wall 611 to serve the same purpose as side walls 612 and 614 serve with respect to the second cover portion.

The term "receptor" is to be understood as an electrically conductive object being configured with a view to capturing and conducting a lightning current.

Throughout the disclosure, the term "conductive", if not specified otherwise, is to be understood as electrically conductive.

The invention has been described with reference to preferred embodiments. However, the scope of the invention is not limited to the illustrated embodiments, and alterations and modifications can be carried out without deviating from the scope of the invention.

LIST OF REFERENCES

2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
38 cord line
40 shear web or spar side
40a trailing edge shear web
40b leading edge shear web
74 first shear web
76 second shear web
80 down conductor
571 recess in first blade shell part
572 recess in second blade shell part
580 electrical connector/adapter
581 connection for connect down conductor to adapter
600 cover member
601 first portion of cover member
602 second portion of cover member
603 base portion of cover member
611, 913 side walls in first portion of cover member
612, 614 side walls in second portion of cover member
620 cylindrical portion of cover member
621, 722, 828 holes in second portion of cover member
710 central opening in base portion
725-727 holes in first portion of cover member
741, 742 trailing-edge portions of cover member
L longitudinal axis

The invention claimed is:
1. A wind turbine blade (10) comprising:
a shell body;
a down conductor (80) arranged in the shell body for conducting lightning current to ground;
an electrical connector (580) arranged in electrical connection with the down conductor; and
a lightning receptor element (510) arranged at a surface of the shell body or outside the shell body, the lightning receptor element being in electrical connection with the electrical connector, the lightning receptor element (510) being located at a trailing edge (20) of the shell body, wherein the shell body has an opening (571, 572) for accommodating the electrical connector (580) and/or the lightning receptor element (510), wherein the blade further comprises a cover member attached to the shell body, the cover member covering the shell body opening, and wherein the cover member comprises:
  a first cover portion (601) having a covering surface configured to engage with a first exterior surface part of the shell body, the first cover portion covering a first portion of the opening (571, 572); and
  a second cover portion (602) having a covering surface configured to engage with a second exterior surface part of the shell body, the second cover portion covering a second portion of the opening (571, 572), and wherein the first cover portion (601) and the second cover portion (602) are each attached to a cover member base portion having a central opening for accommodating the electrical connector and/or the lightning receptor element connected to the electrical connector.

2. The wind turbine blade in accordance with claim 1, wherein at least 30% of an external surface of the lightning receptor element consists of graphite, and/or at least 30% by volume of an exterior portion of the lightning receptor element consists of graphite.

3. The wind turbine blade in accordance with claim 1, wherein the lightning receptor element comprises an exterior portion extending outside the shell body, and wherein the exterior portion consists entirely of graphite.

4. The wind turbine blade in accordance with claim 1, wherein the covering surface of the first cover portion comprises one or more walls (612, 614, 611, 913) which, when the cover member engages the first exterior surface part, define a first chamber together with the first exterior surface part, and/or the covering surface of the second cover portion comprises one or more walls which, when the second cover portion engages the second exterior surface part, define a second chamber.

5. The wind turbine blade in accordance with claim 4, wherein the first and/or second cover portion comprises one or more holes (621, 722, 828, 725, 726, 727) arranged to allow injection of a gluing material into at least a part of the first chamber and/or a part of the second chamber in order to rigidly attach the first cover portion and/or the second cover portion of the cover member to the first and/or second exterior surface part.

6. The wind turbine blade in accordance with claim 5, wherein the cover member is attached to the shell body by the gluing material inside the first chamber and by the gluing material inside the second chamber.

7. The wind turbine blade in accordance with claim 5, wherein the one or more holes (621, 722, 828, 725, 726, 727) are arranged to allow injection of the gluing material into all of the first chamber and/or all of the second chamber.

8. The wind turbine blade in accordance with claim 1, wherein the first cover portion and/or the second cover portion comprises a laminate provided across the first portion of the opening in the shell body and/or across the second portion of the opening in the shell body.

9. The wind turbine blade in accordance with claim 1, wherein a trailing-edge portion of the cover member is adapted to follow a general shape of the trailing edge at a location of the cover member on the shell body.

10. The wind turbine blade in accordance with claim 1, wherein the lightning receptor element is releasable from the electrical connector.

11. A method for manufacturing a wind turbine blade with a lightning protection system, the method comprising:
  providing a wind turbine shell body having a leading edge, a trailing edge, and a tip end, the wind turbine shell body having an opening for accommodating an electrical connector for connecting a lightning receptor element to a down conductor, wherein the opening is formed through a trailing edge of the wind turbine shell body,
  attaching the electrical connector to the down conductor for connecting the lightning receptor element,
  installing a cover member, the cover member comprising:
    i. a first cover portion having a covering surface configured to engage with a first exterior surface part of the wind turbine shell body, the first cover portion covering a first portion of the opening in the wind turbine shell body for accommodating the electrical connector,
    ii. a second cover portion having a covering surface configured to engage with a second exterior surface part of the wind turbine shell body, the second cover portion covering a second portion of the opening in the wind turbine shell body for accommodating the electrical connector,
  the first and second cover portion being attached to a cover member base portion comprising a central opening for accommodating the electrical connector and/or the lightning receptor element, when inserted into the electrical connector, and
  attaching a lightning receptor element to the electrical connector through the cover member base portion central opening.

12. The method in accordance with claim 11, wherein the wind turbine shell body comprises two blade shell parts, and wherein the method comprises:
  down conductor to one or both shell parts.

13. The method in accordance with claim 12, wherein the method comprises:
  joining the two shell parts to form the wind turbine shell body.

14. A wind turbine blade (10) comprising:
  a shell body;
  a down conductor (80) arranged in the shell body for conducting lightning current to ground;
  an electrical connector (580) arranged in electrical connection with the down conductor; and
  a lightning receptor element (510) arranged at a surface of the shell body or outside the shell body, the lightning receptor element being in electrical connection with the electrical connector,
  wherein the shell body has an opening (571, 572) for accommodating the electrical connector (580) and/or the lightning receptor element (510), the opening (571, 572) being formed through a trailing edge of the shell body,
  wherein the blade further comprises a cover member attached to the shell body, the cover member covering the shell body opening, and wherein the cover member comprises:
    a first cover portion (601) having a covering surface configured to engage with a first exterior surface part of the shell body, the first cover portion covering a first portion of the opening (571, 572); and
    a second cover portion (602) having a covering surface configured to engage with a second exterior surface part of the shell body, the second cover portion covering a second portion of the opening (571, 572), and wherein the first cover portion (601) and the second cover portion (602) are each attached to a cover member base portion having a central opening for accommodating the electrical connector and/or the lightning receptor element connected to the electrical connector.

\* \* \* \* \*